July 18, 1967 R. CHAUPRADE 3,332,037

PHASE-MODULATION PULSE GENERATOR

Filed Aug. 17, 1964 3 Sheets-Sheet 1

United States Patent Office 3,332,037

Patented July 18, 1967

3,332,037

PHASE-MODULATION PULSE GENERATOR

Robert Chauprade, Puteaux, France, assignor to Le Materiel Electrique S.W., Paris, France, a French company Filed Aug. 17, 1964, Ser. No. 389,885
Claims priority, application France, Aug. 20, 1963, 945,079
2 Claims. (Cl. 332—14)

ABSTRACT OF THE DISCLOSURE

A phase-modulation pulse generator controls the conduction of control-electrode rectifiers. A bistable element is connected to a sinusoidal voltage source and to a phase-displacer circuit connected to a second bistable element which in turn is connected to the primary of a saturable transformer. The secondary of the transformer is the output circuit.

This invention relates to a phase-modulation pulse generator, intended more particularly to control the conduction of rectifiers comprising a control electrode.

A rectifier of this kind is made to conduct by the application of a pulse of a given value and time to its control electrode.

The object of the present invention is to provide a pulse generator whose pulses are of constant size and accurate phase-shift, and variable with respect to a sinusoidal synchronization or reference voltage, thus determining the time when the control-electrode rectifier conducts.

The sinusoidal reference voltage is generally a voltage having a fixed phase-displacement with respect to the anode voltage of the controlled rectifier.

The pulse generator according to the invention is more rapid and more accurate than existing means and uses a transistorized phase-displacer without a time constant.

A bistable element is fed by a sinusoidal voltage source and is connected to a phase-displacer circuit which controls a second bistable element conected to the primary of a saturable transformer whose secondary winding forms the circuit output.

The invention will be described in greater detail hereinbelow with reference to a specific embodiment illustrated in the drawings.

Figure 1:
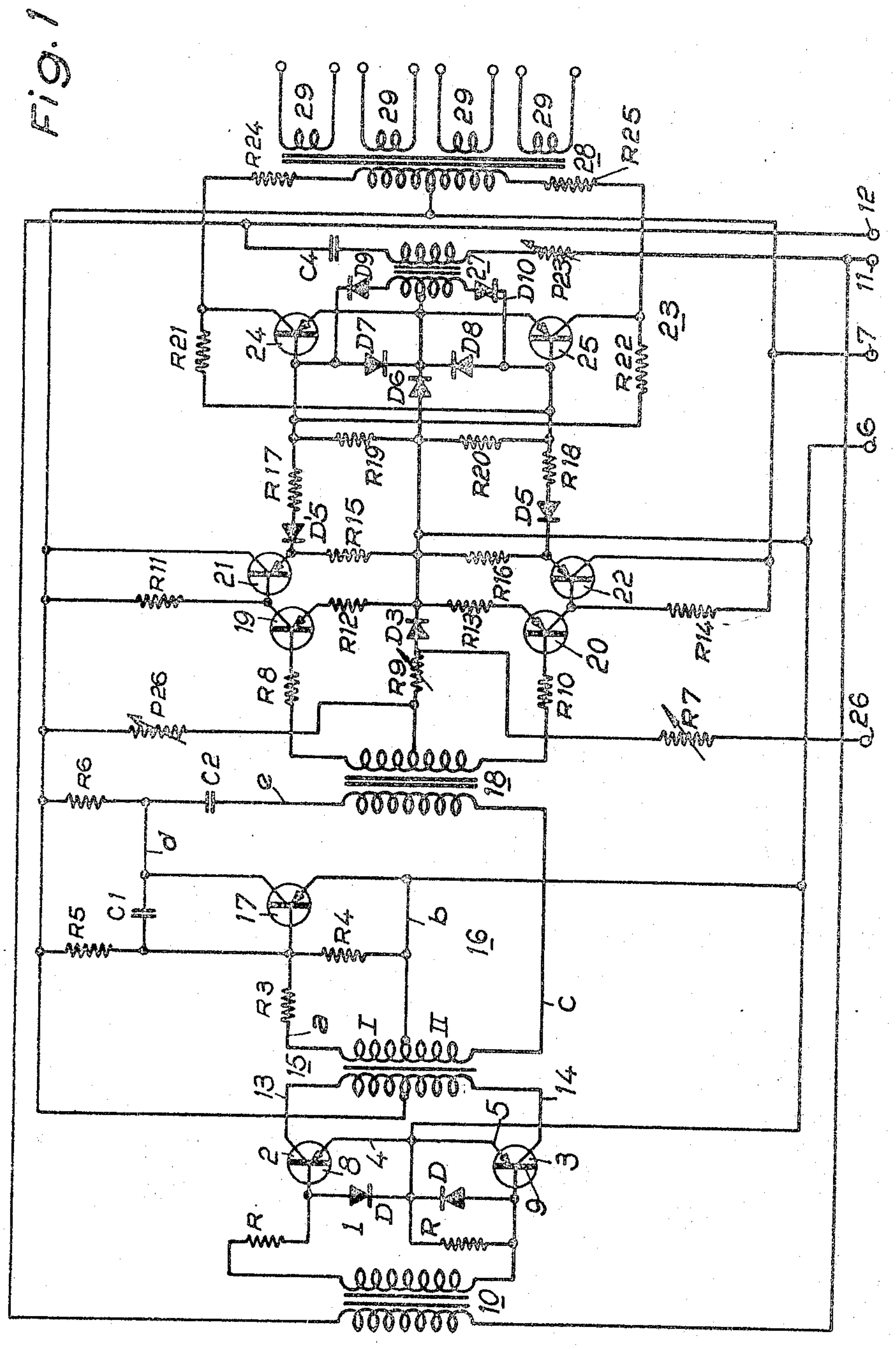
FIG. 1 is a circuit diagram of one exemplified embodiment of the invention.

FIGS. 3*a*, 3*b*, 3*c*, 3*d*, 3*e*, 3*f*, 3*g*, 3*h* and 3*i* show the voltage against the time at various points of the circuit shown in FIG. 1.

The apparatus shown in FIG. 1 comprises a flip-flop 1, for example formed by two transistors 2 and 3, whose emitters 4 and 5 are fed with a D.C. voltage via terminal 6, and whose bases 8 and 9 are connected to the secondary winding of a transformer 10 whose primary winding receives sinusoidal A.C. via terminals 11 and 12. The flip-flop 1 also contains conventional elements such as protective resistors R and clipper diodes D.

The collectors 13 and 14 of the transistors 2 and 3 of the flip-flop 1 are connected to the primary winding of a transformer 15 whose centre point is connected to terminal 7 and whose secondary winding I is connected to an integrator circuit, for example a Miller integrator 16, comprising a transistor 17 whose emitter and collector are connected to the terminals 6 and 7, resistors $R_3$–$R_6$, and capacitor $C_1$.

The object of the resistor $R_3$ is to limit the voltage and current at the base of transistor 17. Components $R_4$ and $R_5$ are bias resistors for the transistor 17 for class A operation. Resistor $R_6$ is the load resistor in the collector of the transistor 17.

The collector of transistor 17 is connected to a terminal of a capacitor $C_2$, whose other terminal is connected to the primary winding of a transformer 18.

The secondary winding of the transformer 18 is connected to a phase displacer comprising two transistors 19 and 20, the components $P_{26}$, $R_8$, $R_{10}$, $R_9$, $R_{12}$, $R_{13}$, $R_{11}$, $R_{14}$ and diode $D_3$. This phase displacer circuit is controlled by a signal applied to terminals 6 and 26 and passing through resistor $R_7$.

Component $P_{26}$ is a potentiometer to control the bias for the transistors 19 and 20.

Resistor $R_7$ is variable and limits the control current of the transistors 19 and 20. The resistors $R_8$ and $R_{10}$ are the base resistors of the transistors 19 and 20 and limit the base current thereof. Resistor $R_9$ is variable and is an anti-feedback resistor for transistors 19 and 20; resistors $R_{11}$ and $R_{14}$ are load resistors in the collector of the transistors 19 and 20. Resistors $R_{12}$ and $R_{13}$ are the emitter resistors of the transistors 19 and 20. Diode $D_3$ limits the control voltage at the terminals of transistors 19 and 20. The collectors of transistors 19 and 20 are connected to the bases of transistors 21 and 22 the latter accurately following the operation of the transistors 19 and 20. The emitter circuits of the transistors 21 and 22 contain resistors $R_{15}$ and $R_{16}$; the diodes $D_5$ and $D_5'$ are blocking diodes for the voltage for the transistors 21 and 22.

The emitters of the transistors 21 and 22 are connected to a flip-flop 23 comprising two transistors 24 and 25 whose base currents are limited by resistors $R_{17}$ and $R_{19}$ in the case of transistor 24 and resistors $R_{18}$ and $R_{20}$ in the case of transistor 25. Resistors $R_{21}$ and $R_{22}$ respectively stabilize the base potential of transistors 25 and 24 and facilitate operation of the flip-flop 23. A diode $D_6$ isolates the potentials between the emitter circuits of the transistors 24 and 25 and of the transistors 21 and 22. Diodes $D_7$ and $D_8$ clip the base signal of transistors 25 and 25.

The bases of transistors 24 and 25 receive a signal originating from the secondary winding of a saturable transformer 27 whose primary winding receives via terminals 11 and 12 the synchronization signal which is phase-displaced via circuit $C_4$, $P_{23}$. Potentiometer $P_{23}$ varies the phase-displacement of the primary voltage of the transformer 27 in relation to the synchronization signal. The secondary winding of transformer 27 is connected via rectifier diodes $D_9$ and $D_{10}$ to the bases of the transistors 24 and 25. The collectors of the latter transistors are connected via resistors $R_{24}$ and $R_{25}$ to the primary of a saturable transformer 28 whose secondary windings 29 are connected, for example, to pulse distributing transformers which are intended to multiply the pulse and whose secondary windings control the circuits of the control electrodes of controlled rectifiers.

Figure 2:
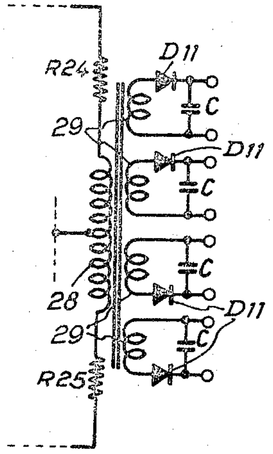
FIG. 2 is an exemplified embodiment in which the device according to the invention is connected directly to the control electrode circuit of the controlled rectifiers.

The secondary windings 29 of the saturable transformer 28 may be connected directly to the control electrode circuit of the controlled rectifiers as shown in FIG. 2, for example, with an inverse pulse blocking $D_{11}$ and a capacitor C providing decoupling from the control electrode circuit of the controlled rectifier.

The circuit illustrated in FIG. 1 will now be described with reference to FIGS. 3 which show the voltages along the *y*-axis and the times along the *x*-axis.

Figure 3A:
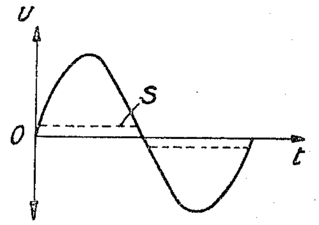

FIG. 3*a* shows the variation of the sinusoidal synchronization or reference voltage provided by the voltage source 11, 12. Reference S is the signal clipped by the diodes D.

Figure 3B:
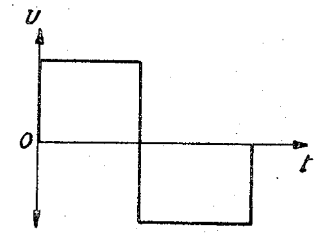

FIG. 3*b* shows the variation of the signal obtained at the terminals *ab* and at the terminals *bc* of the secondary windings I and II of transformer 15.

Figure 3C:
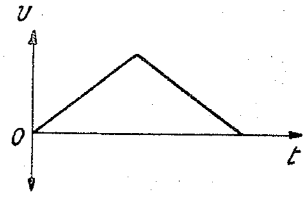

FIG. 3*c* shows the variation of the signal obtained at the terminals *b* and *c*.

Figure 3D:
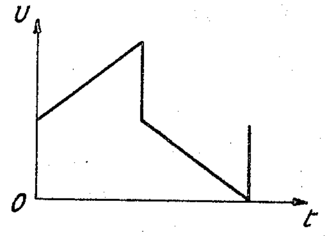

FIG. 3*d* shows the variation of the signal obtained at the terminals *c* and *d*.

Figure 3E:
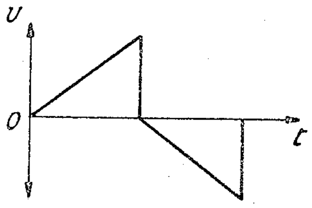

FIG. 3*e* shows the variation of the signal obtained at terminals *c* and *e*.

Figures 3F, 3G, 3H, 3I:
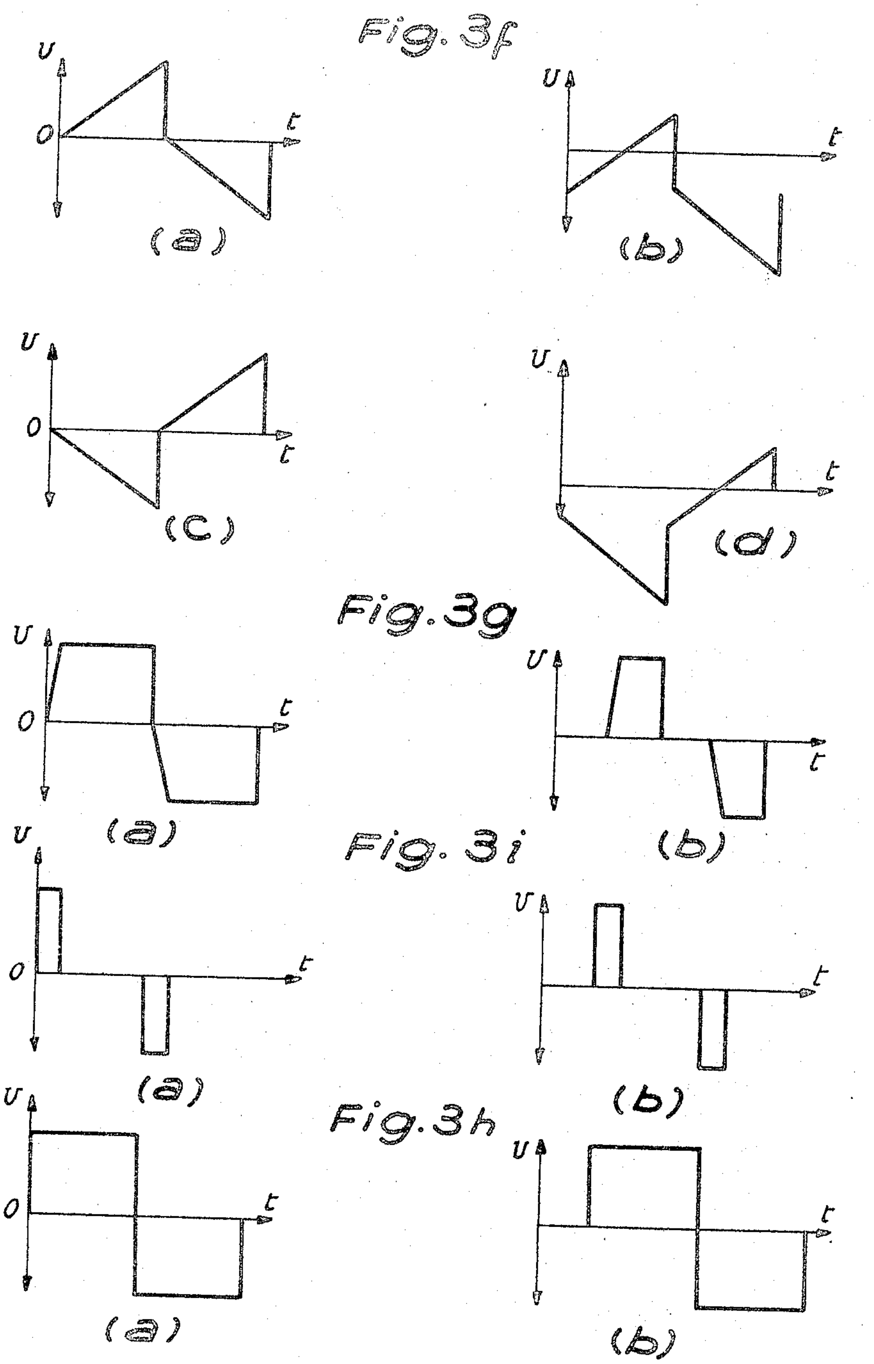

FIG. 3*f*(*a*) shows the variation of the signal obtained at the base of transistor 19.

FIG. 3*f*(*b*) shows the variation of the signal obtained at the base of the transistor 19 with superimposition of a phase-displacement control signal.

FIG. 3*f*(*c*) shows the variation of the signal obtained at the base of the transistor 20.

FIG. 3*f*(*d*) shows the variation of the signal obtained at the base of the transistor 20 with superimposition of a phase-displacement control signal.

FIG. 3*g*(*a*) shows the variation of the signal obtained at the collectors of the transistors 19 and 20.

FIG. 3*g*(*b*) shows the variation of the signal obtained at the collectors of the transistors 19 and 20 with superimposiiton of the phase-displacement control signal.

FIG. 3*h*(*a*) shows the variation of the signal obtained at the collectors of transistors 21 and 22.

FIG. 3*h*(*b*) shows the variation of the signal obtained at the collectors of the transistors 21 and 22 with superimposition of the phase-displacement control signal.

FIG. 3*i*(*a*) shows the variation of the output signal of the circuit.

FIG. 3*i*(*b*) shows the variation of the output signal of the circuit with superimposition of the phase-shift control signal.

The transistors 2 and 3 act as a synchronised flip-flop. The synchronisation signal (3*a*) is applied to the bases of these transistors via transformer 10 (causing the two transistors to conduct and cut-off alternately).

At the output of this flip-flop a rectangular voltage (3*b*) is fed to transformer 15 which reproduces it as its secondary winding at the required amplitude to feed the Miller integrator 16 which gives two symetrical inclines (FIG. 3*c*). FIG. 3*d* shows the integrated signal over which is superimposed the square signal orignating from the secondary II of transformer 15.

The object of capacitor $C_2$ is firstly to block the D.C. component and secondly to make the signal of 1*a* (FIG. 3*d*) symetrical with respect to 0 (FIG. 3*e*). This signal is applied via transformer 18 to the bases of transistors 19 and 20 operating in push-pull. The phase-displacement function is obtained at this level.

The control signal entering between the emitter and base of the transistors 19 and 20 modifies the saturation state of these transistors. This results in displacement of the operating point on the top and bottom inclines as shown in FIGS. 3*f* and 3*g*.

The two transistors 21 and 22 are simply an impedance matcher and accurately follow the transistors 19 and 20 (FIG. 3*h*). Transistors 21 and 22 control the flip-flop comprising the transistors 24 and 25. The flip-flop is both a forming circuit and an amplifier.

The voltage obtained at the collectors of these latter two transistors is of the same frequency as the synchronisation voltage but of variable phase and is a function of the control (or bias) signal.

The output transformer 28 connected in the collectors of the transistors 24 and 25 is saturable. This means that the rectangular voltage (FIG. 3*h*) delivered by the flip-flop is converted at the secondary winding to a pulse of a time determined by the saturation of the transformer 28 (FIG. 3*i*).

The signal taken from a secondray winding is fed either to the control electrode circuit of a controlled rectifier in the case shown in FIG. 2 or to the primary winding of a pulse distributor transformer (FIG. 1).

The circuit formed by transformer 27, capacitor $C_4$, potentiometer $P_{23}$ and diodes $D_9$ and $D_{10}$ is intended to limit the pulse phase displacement to an angle chosen according to requirements. At the primary winding the transformer 27 receives a sinusoidal voltage which is out of phase with respect to the reference or synchronisation voltage. This transformer is saturable and at the beginning of the cycle delivers a pulse to the secondary windings to render the flip-flop 23 conductive. The position of this pulse depends on the phase displacement provided by $C_4$ and $P_{23}$.

I claim:

1. A phase-modulation pulse generator for controlling the conduction of control-electrode rectifiers, comprising a bistable element fed by a source of sinusoidal voltage, means for connecting the output of said bistable element to a phase-displacer circuit including two transistors adapted to receive a phase displacement control signal, said means including a Miller integrator circuit having its input connected to receive said output of said bistable element and its output connected to the primary of a transformer via a capacitor, the secondray of said transformer being connected to the bases of said two transistors, said two transistors being connected in phase opposition, means for applying the phase displacement control signal to the emitters of said two transistors, a second bistable element connected to be controlled by the output of said phase displacer circuit, a saturable output transformer including a primary winding and a secondary winding, said primary winding being connected to receive the output of said second bistable element and said secondary winding forming the circuit output of the phase-modulation pulse generator.

2. A pulse generator as set forth in claim 1 wherein the second bistable element comprises two transistors having their bases connected to receive the output of said phase displacer circuit and further including means for applying to said bases a pulse at the beginning of the cycle of said sinusoidal voltage, said pulse being out-of-phase by a selected angle.

References Cited

UNITED STATES PATENTS

| | | | |
|---|---|---|---|
| 2,392,114 | 1/1946 | Barelink | 332—14 |
| 2,636,984 | 4/1953 | Confora | 332—14 X |
| 3,187,260 | 6/1965 | Dove | 328—67 X |

ROY LAKE, *Primary Examiner.*

ALFRED L. BRODY, *Examiner.*